Figure 1:
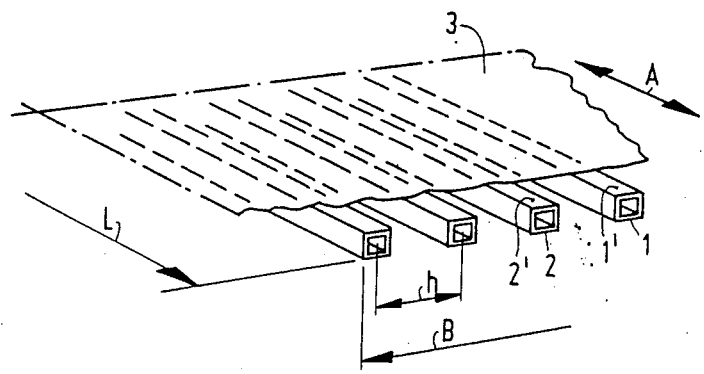

United States Patent [19]

van Rens

[11] Patent Number: 4,924,623
[45] Date of Patent: May 15, 1990

[54] SUPPORTING STRUCTURE FOR SEED BEDS

[76] Inventor: Jan L. M. van Rens, Tongerlostraat 12, 5975 NC Sevenum, Netherlands

[21] Appl. No.: 190,794

[22] Filed: May 6, 1988

[30] Foreign Application Priority Data

May 6, 1987 [NL] Netherlands .................. 8701062

[51] Int. Cl.$^5$ ............................................ A01G 1/04
[52] U.S. Cl. .................................... 47/18; 47/1.1; 198/841
[58] Field of Search .............. 47/18, 1.1; 198/841

[56] References Cited

U.S. PATENT DOCUMENTS

| | | | |
|---|---|---|---|
| 1,179,820 | 4/1916 | Gilliland | 52/737 |
| 2,246,578 | 6/1941 | De Salardi | 52/737 |
| 2,866,538 | 12/1958 | Coldberg | 198/841 |
| 2,994,160 | 8/1961 | Sinden | 47/1.1 |
| 3,127,854 | 4/1964 | Reisman | 198/841 |
| 3,824,067 | 7/1974 | Voshel | 198/841 |
| 3,936,975 | 2/1976 | de Winter | 47/1.1 |
| 3,955,668 | 5/1976 | Buschbom | 198/841 |
| 4,215,776 | 8/1980 | Esler | 198/841 |
| 4,325,480 | 4/1982 | Butt | 198/841 |
| 4,344,526 | 8/1982 | Quarella | 198/841 |
| 4,580,388 | 4/1986 | Maisch | 52/739 |

FOREIGN PATENT DOCUMENTS

| | | |
|---|---|---|
| 1237000 | 3/1967 | Fed. Rep. of Germany . |
| 3147091 | 6/1983 | Fed. Rep. of Germany . |
| 43242 | 12/1937 | Netherlands . |
| 1428345 | 3/1976 | United Kingdom . |

*Primary Examiner*—Henry E. Raduazo
*Attorney, Agent, or Firm*—Pennie & Edmonds

[57] ABSTRACT

Supporting structure for seed beds, in particular for cultivating mushrooms, which construction consists of a number of evenly spaced parallel longitudinal girders, whose upper sides form a bearing surface for a synthetic cloth which can be pulled along the upper sides and in the longitudinal direction of the girders by means of mechanical means, during which movement of the cloth garden mould, compost, manure and the like is deposited on the cloth or removed therefrom, whereby the bearing surface for the cloth formed by the upper sides of the girders is provided with a profile in order to reduce the friction between the cloth and the girders.

5 Claims, 2 Drawing Sheets

SUPPORTING STRUCTURE FOR SEED BEDS

The invention relates to a supporting structure for seed beds, in particular for cultivating mushrooms, which construction consists of a number of evenly spaced parallel longitudinal girders, whose upper sides form a bearing surface for a synthetic cloth which can be pulled along the upper sides and in the longitudinal direction of the girders by means of mechanical means, during which movement of the cloth garden mould, compost, manure and the like is deposited on the cloth or removed therefrom.

Such a supporting structure is known. In this known supporting structure 10 to 20 girders are used, which are placed at a mutual centre-to-centre distance of about 10 cm, and whose flat upper sides, as a bottom for the seed beds, form a bearing surface across which a synthetic cloth is dragged, e.g. by means of a winch. The length of the supporting structure is 10 to 30 meters and the width is about 1.50 meters. The cloth, which is generally made of nylon, has a length of about 30 meters and a width of about 1.50 meters. Within the framework of the automation of the cultivating process the cloth is pulled across the supporting structure and simultaneously loaded with compost, manure etc., whereby the load of the cloth is in the order of 150 kg/cm$^2$.

Because the upper side of the girders of the known supporting structure is flat the disadvantage of this supporting structure is that because of the relatively large friction between the cloth and the girders considerable forces must be exerted in order to pull the cloth across the girders, whilst moreover there is a relatively great chance that the cloth will tear.

The purpose of the invention is to obviate these disadvantages and for that purpose it is characterized in that the bearing surface for the cloth formed by the upper sides of the girders is provided with a profile in order to reduce the friction between the cloth and the girders. The advantage of this is that the friction between the cloth and the girders is reduced considerably, as a result of which the forces which are needed for pulling the cloth across the girders can be substantially less, which results in a considerable saving of energy, and the risk that the cloth will tear has practically been removed.

One suitable embodiment of a supporting structure according to the invention consists in that the profile provided at the upper side of the girders is formed by a pattern of evenly spaced, protruding ribs extending in the longitudinal direction of the girders, which ribs are rounded somewhat, at least in the longitudinal direction of the girders. Preferably the ribs present at the upper side of the girders extend from both sides of the girders, transversely to the longitudinal direction thereof, as far as at least the centre of the upper side, whereby the ribs extend parallel to each other as far as the centre of the upper side, or partly overlap each other. Preferably the ribs present at the upper side of the girders extend across the entire width of the girders, transversely to the longitudinal direction of the girders.

One suitable embodiment of a supporting structure according to the invention consists in that, seen in top view, the width of the ribs, measured in the longitudinal direction of the girders, gradually decreases from the centre of the upper side toward the sides of the girders and the ribs are rounded at the ends, the advantage of which is especially that the profiles at the upper sides of the girders cannot silt up, because silt which is formed between the cloth and the girders is spread toward the sides of the girders and discharged when the cloth moves, and the profiles are thus automatically cleaned.

An other suitable embodiment of the invention consists in that the profile provided at the upper side of the girders is formed by evenly spaced patterns of protruding ribs extending in the longitudinal direction of the girders, and the successive patterns are each formed by two central ribs located spaced from each other in the longitudinal direction of the girders, which ribs have a substantially elongated diamond-shape, seen in top view, and which end at a distance from the sides of the girders and are rounded at both these ends, whereby the length of said central ribs, measured in the transverse direction of the girders, is different, as well as by a pair of ribs located on both sides of each central rib, at some distance therefrom, said ribs substantially having the shape of a semi-diamond, seen in top view, whose flat side faces the central ribs and whose corner located near the side of the girders is rounded, whereby the mutual distance between each central rib and the ribs located at the sides thereof are substantially equal. This embodiment has the additional advantage that in addition to being discharged towards the sides of the girders the silt formed between the cloth and the girders can also be discharged through the spaces between the ribs.

Preferably the profile provided at the upper side of the girders has an upper side which is slightly bent from side to side of the girders, which has the advantage that the water required for the seed beds can be discharged more easily.

Embodiments of the invention will be further explained with reference to the drawing.

Figure 2:
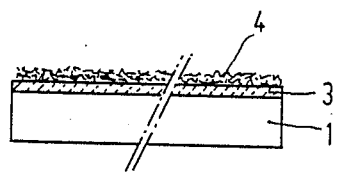
Figure 3:
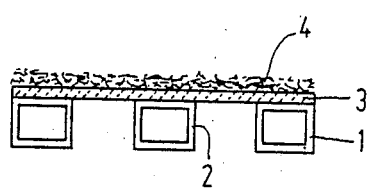
Figure 4:
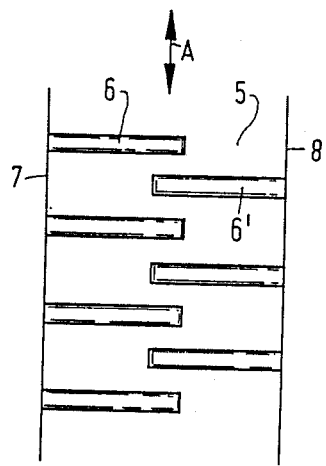
Figure 5:
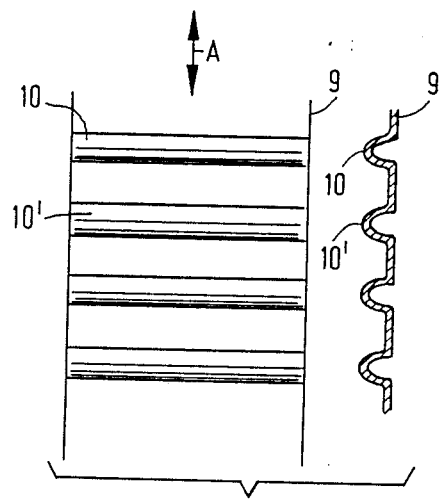
Figure 6:
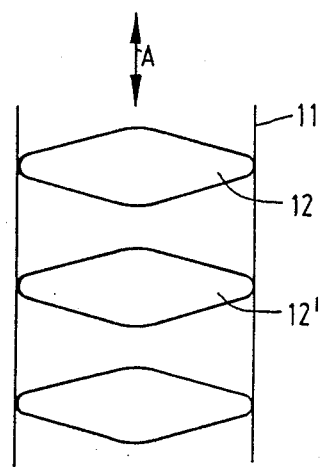
Figure 8:
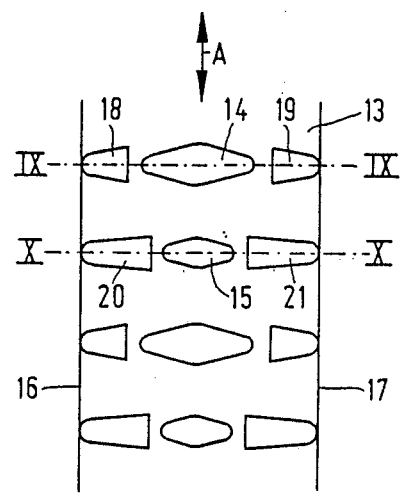
Figure 7:
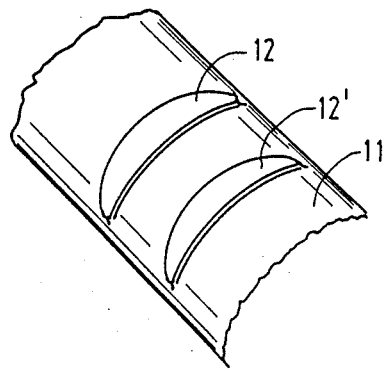
Figure 9:
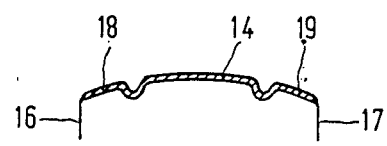
Figure 10:
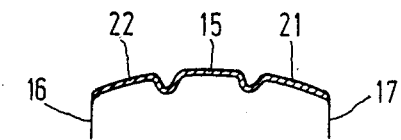

FIG. 1 is a perspective diagrammatic representation of a known supporting structure for seed beds, FIG. 2 is a diagrammatic longitudinal view of the supporting structure illustrated in FIG. 1, FIG. 3 is a diagrammatic front view of the supporting structure illustrated in FIG. 1, FIG. 4 diagrammatically illustrates an upper surface of a girder of a supporting structure according to the invention, FIG. 5 illustrates, in top view and in longitudinal section respectively, an altered pattern of the profile of the upper side of a girder of a supporting structure according to the invention, FIG. 6 illustrates in top view another suitable embodiment according to the invention, FIG. 7 illustrates in perspective the bent form of the ribs illustrated in FIG. 6, FIG. 8 is a top view of yet another suitable embodiment according to the invention, FIG. 9 is a section according to the line IX—IX in FIG. 8, and FIG. 10 is a section according to the line X—X in FIG. 8.

The FIGS. 1–3 show a known supporting construction for seed beds for cultivating mushrooms. The construction consists of a number, 10 to 20 in practice, evenly spaced parallel longitudinal girders 1, 2 . . . in the shape of box girders, whose flat upper sides 1', 2' . . . form a bearing surface for a synthetic cloth 3, which can be pulled in the directions A, by means of mechanical means (not shown), along the upper side and in the longitudinal direction of the girders, during which movement of the cloth 3 garden mould, compost, manure 4 and the like are deposited on the cloth or removed therefrom. The length L of the supporting structure is 10–30 meters, the width B is approximately 1.50 meters and the centre-to-centre distance h of the girders is about 10 cm. The synthetic cloth, which is generally made of nylon, has a length of approximately 30 meters and a width of approximately 1.50 meters. The load formed by the garden mould, compost, manure, etc. is in the order of 150 kg/m$^2$, which means that in view of the relatively great friction between the cloth 3 and the flat upper side 1', 2' . . . of the girders great forces are required for pulling the cloth across the girders. Besides the chance that the cloth will tear hereby is relatively great.

FIG. 4 shows in top view a girder 5 of a supporting structure according to the invention. On the upper surface of the girder (5) there is provided a profile, which has the shape of protruding ribs 6, 6' . . . , which extend from both sides 7, 8 as far as at least the centre of the upper side and which are transverse to the longitudinal direction of the girder 5. In the embodiment illustrated in FIG. 4 the ribs 6, 6' . . . extend at some distance beyond the centre. In order to prevent the cloth from getting caught in the ribs, the ribs are rounded somewhat, at least in the longitudinal direction of the girder (directions A).

FIG. 5 shows, in top view and in longitudinal section respectively, a girder 9 of a supporting structure according to the invention, whereby the profile at the upper side of the girder is formed by ribs 10, 10' . . . , which extend across the entire width of the girder, transversely to the longitudinal direction thereof, and which are rounded, at least in the directions A.

FIG. 6 shows an embodiment of the invention, whereby the profile at the upper side of a girder 11 is formed by protruding ribs 12, 12' . . . , which also extend across the entire width of the girder. In this embodiment the width of the ribs 12, 12' . . . , measured in the longitudinal direction of the girder, gradually decreases from the centre to the sides of the girder, so that the ribs are substantially diamond-shaped, seen in top view. The ribs 12, 12' . . . are slightly rounded at the ends. The advantage of said diamond shape is that when the cloth moves (directions A) across the profiles of the girders silt, which is formed between the cloth and the girders, is spread towards the sides of the girders and can be discharged there, so that silting up of the profiles is prevented. Preferably the ribs 12, 12' . . . have an upper side which is slightly bent from side to side of the girder 11, as is indicated in FIG. 7, which has the advantage that the water required for the seed beds can be discharged easily.

The FIGS. 8–10 show another suitable embodiment of a profile of girders of a supporting structure according to the invention. Said profile consists of repeating patterns of protruding ribs, whereby each pattern is formed by two central ribs 14, 15 extending spaced from each other in the longitudinal direction of the girder 13, which ribs, seen in top view, have a substantially elongated diamond shape and which end at some distance from the sides 16, 17 of the girder 13 and which are rounded at both these ends, whereby the ribs 14, 15 have been given different lengths, measured in the transverse direction of the girder, the ribs 14 e.g. being longer than the ribs 15. On both sides of each rib 14 and 15 respectively there is present, at some distance therefrom, a protruding rib 18, 19 and 20, 21 respectively which, seen in top view, has substantially the shape of a semi-diamond, whose flat side faces the central rib 14 and 15 and whose corner located near the side of the girder 13 is rounded. The spaces between the ribs are substantially equal and are staggered relatively to each other in the longitudinal direction of the girder 13. When the cloth moves across the profiles of FIG. 8 silt, which is formed between the cloth and the girder, will not only be discharged toward the sides of the girder but also through the spaces between the ribs, which prevents silting up of the profiles.

As appears from the FIGS. 8 and 9 the ribs have a slightly bent upper side in this embodiment too, in order to facilitate the discharge of the water required for the seed beds. The radius of curvature of the bent ribs is adjusted hereby to the rigidity of the cloth and the weight of the compost which lands on the cloth. The ends of the ribs 18, 19 and 20, 21 respectively located near the sides 16, 17 are preferably located at some small distance from said sides (see FIGS. 8 and 9), in order to prevent that the load-bearing cloth, which will sag somewhat between neighbouring girders, will come into contact with the side edges of the girders.

I claim:

1. Supporting structure for seed beds, in particular for cultivating mushrooms, said structure consisting of an elongated support supporting a number of transverse ribs making up a bearing surface for an elongated synthetic cloth which can be pulled in a longitudinal direction along the support by mechanical means, during which pulling of said cloth a garden mould, compost, manure and the like is deposited on said cloth or removed therefrom when during a cultivating session seed is cultivated, wherein said bearing surface for said cloth is provided by said ribs, said ribs having a length extending transverse to said longitudinal direction, and a width in said longitudinal direction, said ribs being spaced in relation to their width such that the cloth is wholly supported by the ribs, wherein the ribs are formed to describe a pattern comprising two different arrangements of ribs alternating along the longitudinal direction of the support structure, in order to reduce friction between said cloth and said support during said pulling of said cloth.

2. Supporting structure according to claim 1, wherein the edges of said ribs are rounded, at least in the longitudinal direction of movement of the cloth.

3. Supporting structure according to claim 1, wherein the surfaces of the ribs on which the cloth is supported are generally diamond-shaped.

4. The structure of claim 1, wherein a first one of said arrangements comprises a central relatively large diamond-shaped rib between two relatively small end ribs, and the second of said arrangements comprises a central relatively small diamond-shaped rib between two relatively large end ribs.

5. The structure of claim 1 wherein the support structure has an upper side defined by the ribs, and longitudinal edges and the upper side is arched between the longitudinal edges thereof to form a convexly curved surface.

* * * * *